US008751747B2

(12) United States Patent
Sonnelitter, III et al.

(10) Patent No.: US 8,751,747 B2
(45) Date of Patent: Jun. 10, 2014

(54) MANAGEMENT OF CACHE REPLACEMENT STATUS IN CACHE MEMORY

(75) Inventors: Robert J. Sonnelitter, III, Wappingers Falls, NY (US); Gregory W. Alexander, Pflugerville, TX (US); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1425 days.

(21) Appl. No.: 12/037,829

(22) Filed: Feb. 26, 2008

(65) Prior Publication Data

US 2009/0216952 A1 Aug. 27, 2009

(51) Int. Cl.
*G06F 12/00* (2006.01)
*G06F 13/00* (2006.01)
*G06F 13/28* (2006.01)

(52) U.S. Cl.
USPC ............ 711/125; 711/133; 711/E12.02

(58) Field of Classification Search
CPC .................................................. G06F 12/121
USPC ................................. 711/125, 133, E12.02
See application file for complete search history.

(56) References Cited

U.S. PATENT DOCUMENTS

| 5,732,234 | A | * | 3/1998 | Vassiliadis et al. | ............ | 712/200 |
| 6,065,115 | A | * | 5/2000 | Sharangpani et al. | ........ | 712/235 |
| 6,138,213 | A | | 10/2000 | McMinn | | |
| 6,219,760 | B1 | | 4/2001 | McMinn | | |
| 6,446,171 | B1 | * | 9/2002 | Henriksen | ...................... | 711/136 |
| 6,574,709 | B1 | | 6/2003 | Skazinski | | |
| 6,725,329 | B1 | * | 4/2004 | Ng et al. | ........................ | 711/113 |
| 6,848,025 | B2 | * | 1/2005 | Song et al. | .................... | 711/128 |
| 7,139,877 | B2 | | 11/2006 | Hooker | | |
| 2002/0156962 | A1 | * | 10/2002 | Chopra et al. | .................... | 711/3 |
| 2003/0227801 | A1 | * | 12/2003 | Battaglia | ...................... | 365/200 |
| 2004/0042278 | A1 | * | 3/2004 | Bailey | ........................... | 365/200 |
| 2005/0138607 | A1 | * | 6/2005 | Lu | .................................. | 717/136 |
| 2006/0212761 | A1 | * | 9/2006 | Levine et al. | ................... | 714/45 |
| 2009/0204767 | A1 | * | 8/2009 | Hutton et al. | .................. | 711/136 |

OTHER PUBLICATIONS

Hashemi, et al., "Efficient Procedure Mapping Using Cache Line Coloring", Dept. of Electrical and Computer Engineering Northeastern University, Boston, MA, et al., 1997, pp. 171-182.
Csail, et al., "Improving Instruction Cache Performance in OLTP", ACM Transactions on Database Systems, vol. 31, No. 3, Sep. 2006, pp. 887-920.

(Continued)

*Primary Examiner* — Sheng-Jen Tsai
(74) *Attorney, Agent, or Firm* — Cantor Colburn LLP; John Campbell

(57) ABSTRACT

A method for managing cache memory including receiving an instruction fetch for an instruction stream in a cache memory, wherein the instruction fetch includes an instruction fetch reference tag for the instruction stream and the instruction stream is at least partially included within a cache line, comparing the instruction fetch reference tag to a previous instruction fetch reference tag, maintaining a cache replacement status of the cache line if the instruction fetch reference tag is the same as the previous instruction fetch reference tag, and upgrading the cache replacement status of the cache line if the instruction fetch reference tag is different from the previous instruction fetch reference tag, whereby the cache replacement status of the cache line is upgraded if the instruction stream is independently fetched more than once. A corresponding system and computer program product.

13 Claims, 3 Drawing Sheets

(56) References Cited

OTHER PUBLICATIONS

Kistler, et al., "Continuos Program Optimization:A Case Study", ACM Transaction on Programming Languages and Systems, vol. 25, No. 4, Jul. 2003, pp. 500-548.

Qureshi, et al., "The V-Way Cache: Demand Based Associativity via Global Replacement", Proceedings of the 32nd International Symposium on Computer Architecture (ISCA'05), 12 pages.

International Business Machines Corporation (IBM), z/Architecture Principles of Operations, Sixth Edition (Apr. 2007), 1216 (split into 4 parts).

* cited by examiner

MANAGEMENT OF CACHE REPLACEMENT STATUS IN CACHE MEMORY

BACKGROUND OF THE INVENTION

This invention relates generally to computer processor operation, and more particularly to providing a method, system, and computer program product for managing cache memory.

In order to reduce or avoid the time delay (or "latency") of accessing data stored in the main memory of a computer, modern computer processors include a cache memory (or "cache") that stores recently accessed data so that it can be quickly accessed again by the processor. Data that is stored in a cache can be quickly accessed by a processor without the need to access the main memory (or "memory"), thereby increasing the performance of the processor and the computer overall. However, since a cache memory is usually a fraction of the size of a main memory, a limited amount of data can be stored in the cache, and existing (i.e., currently stored) data is evicted (i.e., removed) from the cache to provide space for newly stored data when the cache is full. Therefore, efficiently managing the storage of data in a cache is desirable to maximize the benefits of using a cache.

In that regard, a cache replacement policy is an example of a way to efficiently manage the storage of data in a cache. For example, when data is added to a cache, it is not known if the data will be accessed more than once (if at all) by the computer processor. If the data will be accessed just once (or not at all), it is desirable for the data to be evicted from the cache as soon as possible, whereas if the data will be accessed more than once, it is desirable for the data to be retained in the cache for at least as long as it is needed. A cache replacement policy attempts to address this desired cache management by organizing data for retention or eviction based on a designation of the least recently used data ("LRU") or the most recently used data ("MRU"). However, data is typically transferred and accessed in groupings known as cache lines, which may include more than one item of data. Furthermore, two or more items of data may be accessed in succession in a data "stream", which may be contained in a single cache line or span to other ("sequential") cache lines.

Thus, based on the cache replacement policy, when data (e.g., an item or stream of data) is first added to the cache, the cache line it is included in is designated as the LRU, and when data is accessed by the processor after being added to the cache, the cache line it is included in is designated as the MRU, while other cache lines of data in the cache may be organized between the LRU and the MRU (e.g., in an ordered queue). The LRU cache line will be the most likely candidate to be evicted from the cache, while the MRU cache line will be the most likely candidate to be retained in the cache. However, since the single access of a data stream may cause a repeated access of the same cache line (i.e., to access each item of data in the stream), a cache line may be designated as the MRU even though the data stream it contains is accessed just once and, thus, the cache line will not be accessed more than once for a unique data access. Therefore, it is desirable to have cache management that distinguishes between repeated accesses of a cache line for unique accesses of data and repeated accesses of a cache line for a single access of data such as a data stream.

BRIEF SUMMARY OF THE INVENTION

A method, system, and computer program product for managing cache memory. An exemplary method embodiment includes receiving an instruction fetch for an instruction stream in a cache memory, wherein the instruction fetch includes an instruction fetch reference tag for the instruction stream and the instruction stream is at least partially included within a cache line, comparing the instruction fetch reference tag to a previous instruction fetch reference tag, maintaining a cache replacement status of the cache line if the instruction fetch reference tag is the same as the previous instruction fetch reference tag, and upgrading the cache replacement status of the cache line if the instruction fetch reference tag is different from the previous instruction fetch reference tag, whereby the cache replacement status of the cache line is upgraded if the instruction stream is independently fetched more than once.

An exemplary system embodiment includes a cache control configured to receive an instruction fetch for an instruction stream in a cache memory, wherein the instruction fetch includes an instruction fetch reference tag for the instruction stream and the instruction stream is at least partially included within a cache line, compare the instruction fetch reference tag to a previously received instruction fetch reference tag, maintain a cache replacement status of the cache line if the instruction fetch reference tag is the same as the previous instruction fetch reference tag, and upgrade the cache replacement status of the cache line if the instruction fetch reference tag is different from the previous instruction fetch reference tag, whereby the cache control is configured to upgrade the cache replacement status of the cache line if the instruction fetch is received more than once for an independent fetch of the instruction stream.

An exemplary computer program product embodiment includes a computer usable medium having a computer readable program, wherein the computer readable program, when executed on a computer, causes the computer to receive an instruction fetch for an instruction stream in a cache memory, wherein the instruction fetch includes an instruction fetch reference tag for the instruction stream and the instruction stream is at least partially included within a cache line, compare the instruction fetch reference tag to a previously received instruction fetch reference tag, maintain a cache replacement status of the cache line if the instruction fetch reference tag is the same as the previous instruction fetch reference tag, and upgrade the cache replacement status of the cache line if the instruction fetch reference tag is different from the previous instruction fetch reference tag, whereby the cache replacement status of the cache line is upgraded by the computer if the instruction stream is independently fetched more than once.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for managing cache memory. In accordance with such exemplary embodiments, efficient cache memory management is obtained through a least recently used (LRU)/most recently used (MRU) cache replacement policy in which the cache replacement status is maintained for repeated cache line accesses related to a single fetch to an instruction stream and the cache replacement status is upgraded for repeated cache line accesses related to unique or independent fetches to the same instruction stream. As a result, useful data is retained in a cache memory longer, while unneeded data is evicted from the cache memory sooner, thereby providing better performance through more cache hits and fewer cache misses.

Figure 1:
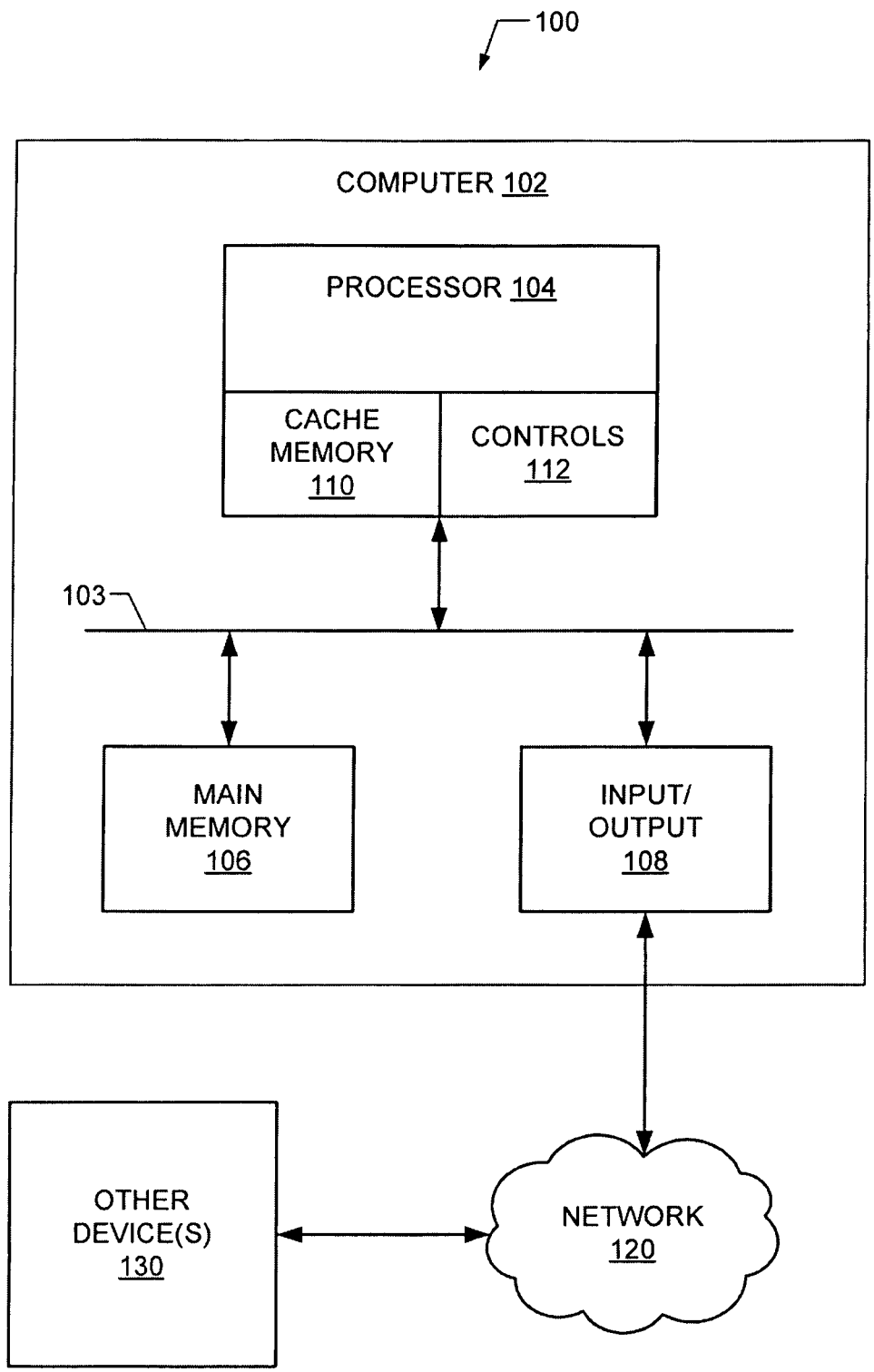
FIG. 1 is a block diagram illustrating an example of a computer system including an exemplary computing device configured for managing cache memory.

Turning now to the drawings in greater detail, wherein like reference numerals indicate like elements, FIG. 1 illustrates an example of a computer system 100 including an exemplary computing device ("computer") 102 configured for managing cache memory. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 includes cache memory ("cache") 110 and controls 112, which include components configured for managing cache memory that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache 110 by controls 112 for execution by processor 104 input/output component(s) 108 may include one or more components that facilitate local and/or remote input/output operations to/from computer 102, such as a display, keyboard, modem, network adapter, etc. (not depicted).

Figure 2:
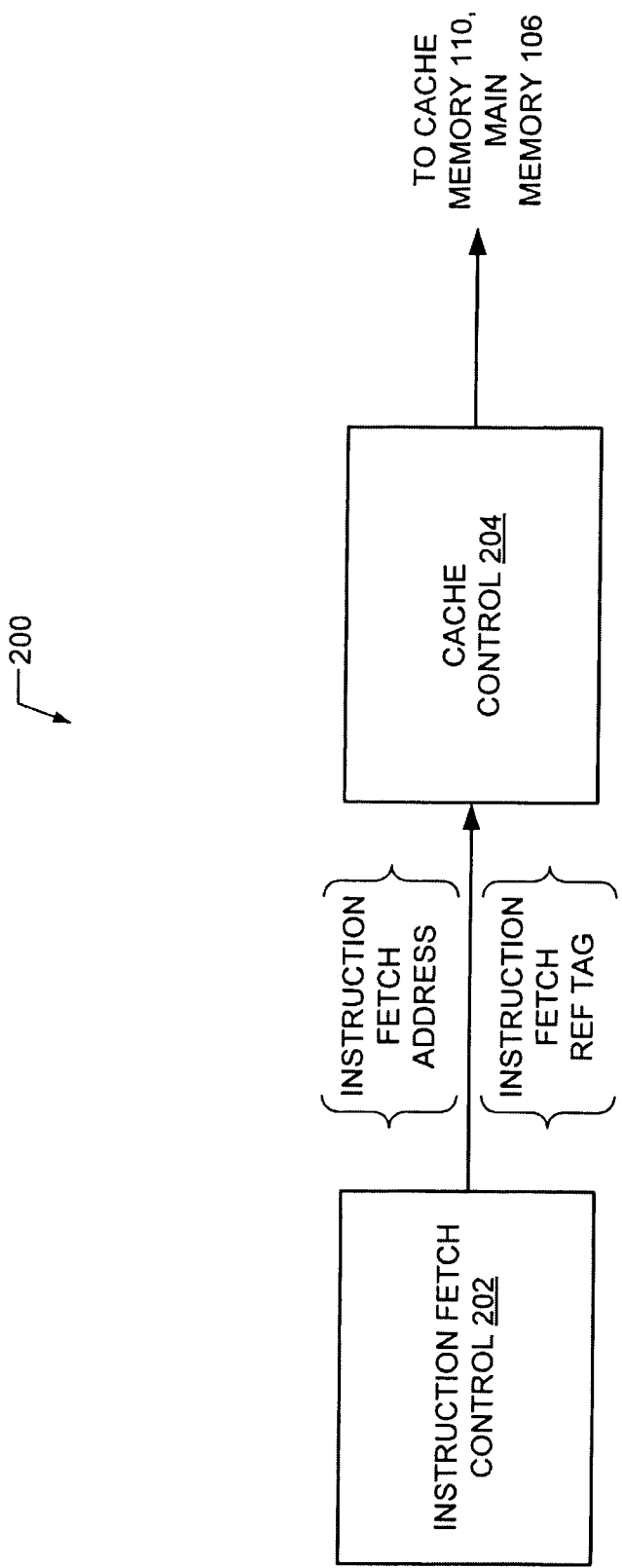
FIG. 2 is a block diagram illustrating an example of a processor subsystem of the exemplary computing device of FIG. 1 that is configured for managing cache memory.

FIG. 2 illustrates an example of a processor subsystem 200 of exemplary computer 102 that is configured for managing cache memory. Exemplary subsystem 200 may, e.g., be part of controls 1 12. Subsystem 200 includes instruction fetch control ("IFC") 202 and cache control ("CC") 204, which are in communication, e.g., via one or more buses, circuits, connections, etc. IFC 202 is configured to send an instruction fetch to CC 204 for an instruction stream (e.g., one or more instructions) that is presumed to be stored in cache memory 110. The instruction fetch includes an instruction fetch reference tag (which will be discussed further below) for the fetched instruction stream, e.g., in addition to an instruction fetch address. The fetched instruction stream is at least partially included within a cache line. For example, the instruction stream may be included within the cache line or span from the cache line to a sequential cache line. In some embodiments, IFC 202 is also configured to replace an instruction fetch reference tag with a different instruction fetch reference tag if the instruction fetch is independent of the most previously sent instruction fetch for the instruction stream.

CC 204 is also in communication with cache memory 110 and main memory 1.06, e.g., via one or more buses, circuits, connections, etc. CC 204 is configured to receive the instruction fetch from IFC 202. CC 204 is also configured to compare a currently received instruction fetch reference tag to the previously received instruction fetch reference tag. Furthermore, CC 204 is also configured to maintain a cache replacement status of the cache line (which will be discussed further below) if the instruction fetch reference tag is the same as the previous instruction fetch reference tag and to upgrade the cache replacement status of the cache line if the instruction fetch reference tag is different from the previous instruction fetch reference tag. Thus, CC 204 is configured to upgrade the cache replacement status of the cache line if the instruction fetch is received more than once for an independent fetch of the instruction stream.

In some embodiments, CC 204 is also configured to send the instruction fetch to main memory 106 and assign the cache line a least recently used (LRU) cache replacement status if an instruction stream that is fetched does not exist in cache memory 110. In other embodiments, CC 204 is also configured to evict a cache line from cache memory 110 when space is needed if the cache line has a least recently used (LRU) status and to retain the cache line in cache memory 110 if the cache line has a most recently used (MRU) status. Furthermore, in some embodiments, CC 204 is also configured to upgrade the cache replacement status of a cache line to a most recently used (MRU) cache replacement status. An exemplary operation of subsystem 200 is described below with respect to exemplary method 300.

Figure 3:
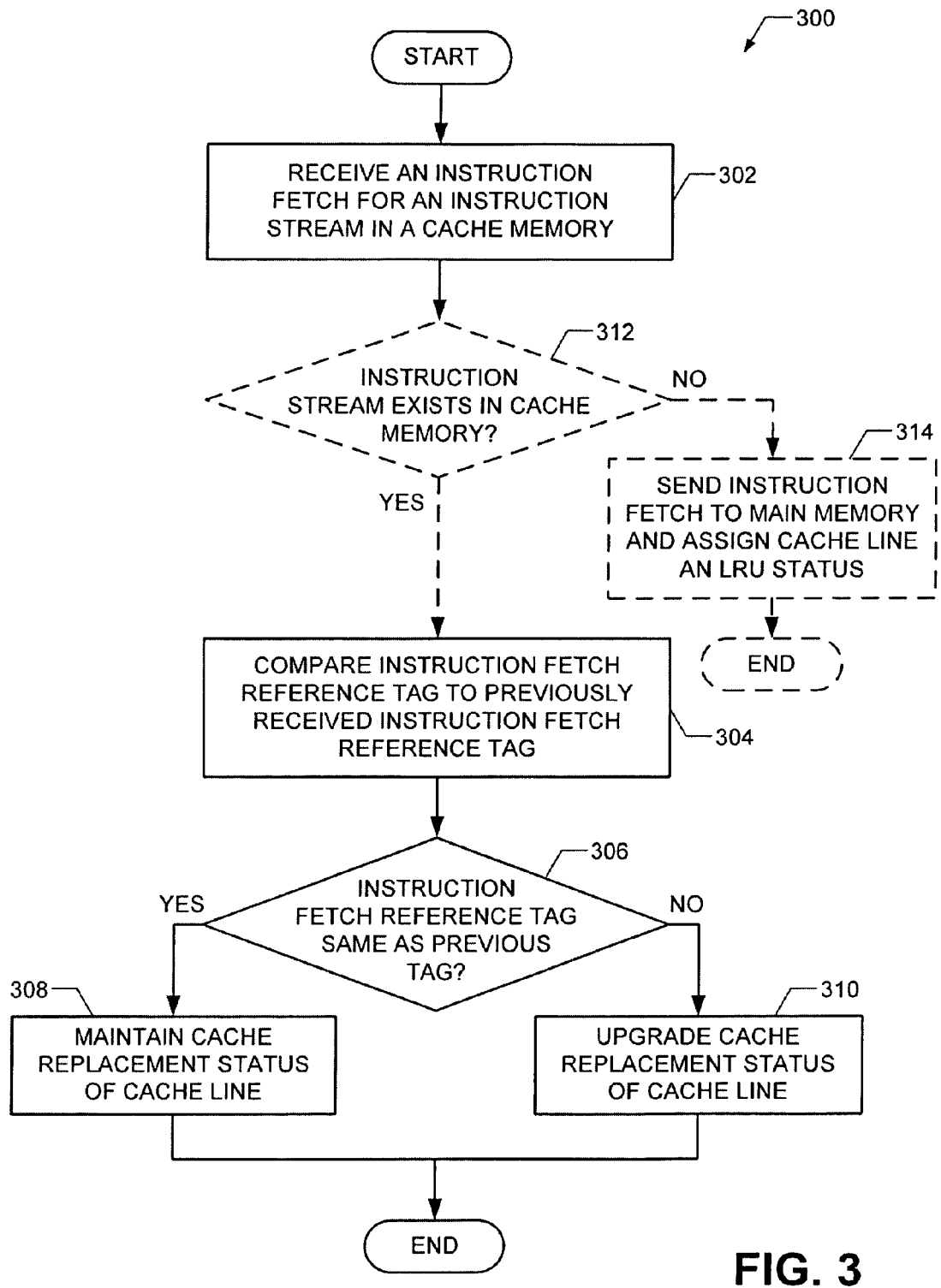
FIG. 3 is a flow diagram illustrating an example of a method for managing cache memory executable, for example, on the exemplary computing device of FIG. 1.

FIG. 3 illustrates an example of a method 300 for managing cache memory executable, for example, on exemplary computer 102. In block 302, an instruction fetch is received (e.g., by CC 204) for an instruction stream in a cache memory (e.g., cache memory 110). The instruction fetch (which may be sent, e.g., from IFC 202) includes an instruction fetch reference tag for the instruction stream and the instruction stream is at least partially included within a cache line. The instruction fetch reference tag may, e.g.; be a program-store-compare (PSC) tag and distinguishes an instruction fetch to an instruction stream from another, independent instruction fetch to the same instruction stream. For example, a first instruction fetch reference tag may be received with one or more fetches to a cache line to reference one or more related instruction streams, and a second, different instruction fetch reference tag can be received with one or more new, unique fetches to the cache line (e.g., for a subsequent taken branch) to reference the one or more related instruction streams.

In block 304, the instruction fetch reference tag is compared (e.g., by CC 204) to a previous instruction fetch reference tag (e.g., which was retained by CC 204 from a previous instruction fetch). In some embodiments, the previous instruction fetch reference tag is the most previous instruction fetch reference tag (e.g., immediately preceding the current tag). In block 306, the condition of whether the instruction fetch reference tag is the same as the previous instruction fetch reference tag is determined (e.g., by CC 204). If the instruction fetch reference tag is the same as the previous instruction fetch reference tag, method 300 proceeds with block 308 in which the cache replacement status of the cache line is maintained (i.e., not changed—e.g., by CC 204). If the instruction fetch reference tag is different from the previous instruction fetch reference tag, method 300 proceeds with block 310 in which the cache replacement status of the cache line is upgraded (e.g., by CC 204). In some embodiments, the cache replacement status is upgraded to a most recently used (MRU) status.

In some embodiments, the performance of blocks 304, 306, 308, and 310 is dependent on an additional block 312 in which the condition of whether the fetched instruction stream exists in the cache memory is determined (e.g., by CC 204). If the instruction stream exists in the cache memory (e.g., a cache hit), method 300 continues with blocks 304, 306, 308, and 310 as described above, wherein the cache replacement status of the cache line is either maintained or upgraded dependent on the comparison of the instruction fetch reference tag to the previous tag. If the instruction stream does not exist in the cache memory (e.g., a cache miss), method 300 continues with block 314 in which the instruction fetch is sent (e.g., by CC 204) to a main memory (e.g., main memory 106) to fetch the instruction stream and the cache line containing the instruction stream is assigned a least recently used (LRU) cache replacement status.

In some embodiments, the cache replacement status of a cache line may be a least recently used (LRU) status, a most recently used (MRU) status, or an intermediate status between the LRU status and the MRU status, e.g., similar to an LRU/MRU cache replacement policy. In such embodiments, method 300 may further include evicting the cache line from the cache memory (e.g., by CC 204) when space is needed if the cache line has the LRU status, and retaining the cache line in the cache memory (e.g., by CC 204) if the cache line has the most recently used MRU status. In other embodiments, the instruction fetch reference tag is replaced with a different instruction fetch reference tag (e.g., by IFC 202) if the instruction fetch is independent of the most previous instruction fetch for the instruction stream (e.g., if the instruction stream is fetched again for a subsequent taken branch).

Although exemplary method 300 is described with respect to an exemplary operation of a single instruction fetch received, e.g., by a single cache control (e.g., CC 204) sent, e.g., from a single instruction fetch control (e.g., IFC 202) to fetch, e.g., a single instruction stream from, e.g., a single cache memory (e.g., cache 110) or single main memory (e.g., memory 106) and with respect to single set of instruction fetch reference tags (e.g., current, previous, etc.). It should be understood that exemplary method 300 also applies to an exemplary operation of a plurality (e.g., two or more) instruction fetches received, e.g., by one or more cache controls sent, e.g., from one or more instruction fetch controls to fetch, e.g., a plurality of instruction streams from, e.g., one or more cache memories and/or one or more main memories with respect to a plurality of sets of instruction fetch reference tags, which may be implemented simultaneously, concurrently (e.g., interleaved), etc.

Elements of exemplary computer system 100, such as computer 102, are illustrated and described with respect to various components, modules, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100 and exemplary subsystem 200, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for managing cache memory, wherein consecutive instruction fetches of instructions of an instruction stream to a cache line do not upgrade cache replacement status for the cache line, comprising:
   receiving, on a cache control, an instruction fetch for an instruction of an instruction stream, the instruction fetch including an instruction fetch reference tag for the instruction stream and the instruction stream is at least partially included within a cache line, the instruction fetch reference tag distinguishing the instruction stream from another instruction stream;
   comparing the instruction fetch reference tag to a previous instruction fetch reference tag currently associated with the cache line;
   maintaining a cache replacement status of the cache line, the cache replacement status comprising a least recently used (LRU) status or an intermediate status between the LRU status and a most recently used (MRU) status, based on the instruction fetch reference tag being the same as the previous instruction fetch reference tag; and
   upgrading the cache replacement status of the cache line to the MRU status based on the instruction fetch reference tag being different from the previous instruction fetch reference tag.

2. The method of claim 1, wherein comparing the instruction fetch reference tag, maintaining a cache replacement status, and upgrading the cache replacement status are dependent on the instruction stream existing in the cache memory; and further comprising sending the instruction fetch to a main memory and assigning the cache line a cache replacement status comprising the LRU status based on the instruction stream not existing in the cache memory.

3. The method of claim 1, further comprising:
evicting the cache line from the cache memory when space is needed based on the cache line having the LRU status; and
retaining the cache line in the cache memory based on the cache line having the MRU status.

4. The method of claim 1, wherein the previous instruction fetch reference tag for the instruction stream is a most previous instruction fetch reference tag for the instruction stream; and
further comprising replacing the instruction fetch reference tag with a different instruction fetch reference tag based on the instruction fetch being independent of the most previous instruction fetch for the instruction stream.

5. A system for managing cache memory, comprising a cache control configured to:
receive an instruction fetch for an instruction of an instruction stream, the instruction fetch including an instruction fetch reference tag for the instruction stream and the instruction stream is at least partially included within a cache line, the instruction fetch reference tag distinguishing the instruction stream from another instruction stream;
compare the instruction fetch reference tag to a previously received instruction fetch reference tag currently associated with the cache line;
maintain a cache replacement status of the cache line, the cache replacement status comprising a least recently used (LRU) status or an intermediate status between the LRU status and a most recently used (MRU) status, based on the instruction fetch reference tag being the same as the previous instruction fetch reference tag; and
upgrade the cache replacement status of the cache line to the MRU status based on the instruction fetch reference tag being different from the previous instruction fetch reference tag.

6. The system of claim 5, further comprising an instruction fetch control configured to send the instruction fetch to the cache control.

7. The system of claim 6, wherein the previous instruction fetch reference tag for the instruction stream is a most previously received instruction fetch reference tag for the instruction stream; and
the instruction fetch control is further configured to replace the instruction fetch reference tag with a different instruction fetch reference tag based on the instruction fetch being independent of the most previously received instruction fetch for the instruction stream.

8. The system of claim 5, wherein the cache control is further configured to:
compare the instruction fetch reference tag, maintain a cache replacement status, and upgrade the cache replacement status dependent on the instruction stream existing in the cache memory; and
send the instruction fetch to a main memory and assign the cache line a cache replacement status comprising the LRU status based on the instruction stream not existing in the cache memory.

9. The system of claim 5, wherein the cache control is further configured to:
evict the cache line from the cache memory when space is needed based on the cache line having the LRU status; and
retain the cache line in the cache memory based on the cache line having the MRU status.

10. A computer program product for managing cache memory, the computer program product comprising:
a tangible storage medium readable by a processing circuit and storing instructions for execution by the processing circuit for performing a method comprising:
receiving an instruction fetch for an instruction of an instruction stream, the instruction fetch including an instruction fetch reference tag for the instruction stream and the instruction stream is at least partially included within a cache line, the instruction fetch reference tag distinguishing the instruction stream from another instruction stream;
comparing the instruction fetch reference tag to a previously received instruction fetch reference tag currently associated with the cache line;
maintaining a cache replacement status of the cache line, the cache replacement status comprising a least recently used (LRU) status or an intermediate status between the LRU status and a most recently used (MRU) status, based on the instruction fetch reference tag being the same as the previous instruction fetch reference tag; and
upgrading the cache replacement status of the cache line to the MRU status if based on the instruction fetch reference tag being different from the previous instruction fetch reference tag.

11. The computer program product of claim 10, wherein the computer readable program, when executed on the computer, causes the computer to compare the instruction fetch reference tag, maintain a cache replacement status, and upgrade the cache replacement status dependent on the instruction stream existing in the cache memory; and
further comprising sending the instruction fetch to a main memory and assigning the cache line a cache replacement status comprising the LRU status based on the instruction stream not existing in the cache memory.

12. The computer program product of claim 10, wherein the computer readable program, when executed on the computer, further causes the computer to:
evicting the cache line from the cache memory when space is needed based on the cache line having the LRU status; and
retaining the cache line in the cache memory based on the cache line having the MRU status.

13. The computer program product of claim 10, wherein the previous instruction fetch reference tag for the instruction stream is a most previously received instruction fetch reference tag for the instruction stream; and
the computer readable program, when executed on the computer, further causes the computer to replace the instruction fetch reference tag with a different instruction fetch reference tag based on the instruction fetch being independent of the most previously received instruction fetch for the instruction stream.

* * * * *